No. 649,840. Patented May 15, 1900.
H. K. HESS, A. J. SHINN & C. HERING.
PROCESS OF OPERATING PRIMARY BATTERIES AND REGENERATING ELEMENTS THEREOF.
(Application filed Dec. 6, 1899.)
(No Model.)
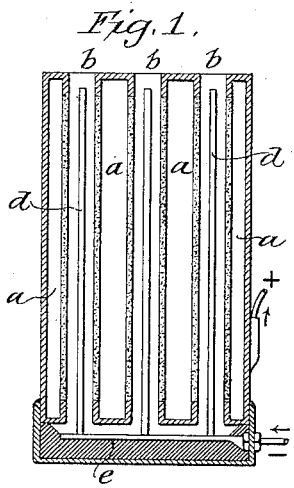
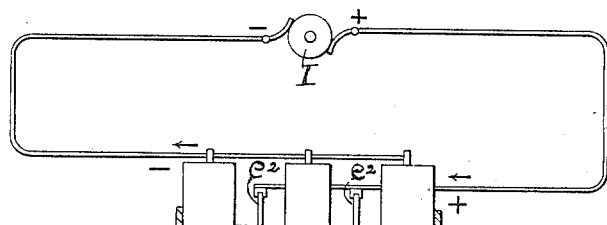
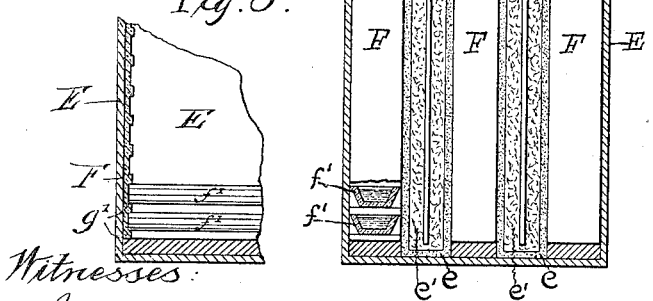

UNITED STATES PATENT OFFICE.

HENRY K. HESS, ALBERT J. SHINN, AND CARL HERING, OF PHILADELPHIA, PENNSYLVANIA, ASSIGNORS TO HERMAN J. DERCUM, TRUSTEE, OF SAME PLACE.

PROCESS OF OPERATING PRIMARY BATTERIES AND REGENERATING ELEMENTS THEREOF.

SPECIFICATION forming part of Letters Patent No. 649,840, dated May 15, 1900.

Application filed December 6, 1899. Serial No. 739,431. (No specimens.)

*To all whom it may concern:*

Be it known that we, HENRY K. HESS, ALBERT J. SHINN, and CARL HERING, citizens of the United States, and residents of the city of Philadelphia, Pennsylvania, have invented certain Improvements in Processes of Operating Primary Batteries and Regenerating the Active Elements Thereof, of which the following is a specification.

Our invention relates to certain improvements in primary batteries of the type commonly known as "two-liquid" batteries, in which the cells are separated by porous partitions, the alternate cells containing the depolarizing agent and the other cells containing the excitant liquid and the anodes. In one form of this battery chromic acid is used as the depolarizing agent, dilute sulfuric acid as the excitant, and zinc plates as the anodes.

Our improved process consists in using a compound consisting of a depolarizing agent and an exciting agent in both compartments of a battery, the exciting agent in the depolarizing compartment being chemically inactive, while the depolarizing agent in the compartment for the excitant is reduced or chemically inactive, and in combining these two liquids after the battery has been exhausted and regenerating them as a single compound, so that they can be used after regeneration as a depolarizing agent or after the chromic acid is reduced as an excitant of a primary battery, as fully described hereinafter.

In the accompanying drawings, Figure 1 illustrates one form of battery in which our invention may be carried out, and Fig. 2 one form of regenerator. Fig. 3 is a fragmentary detail view hereinafter referred to.

The battery consists of a casing which is divided, by means of porous partitions, into a series of compartments. The alternate compartments *a* are for the depolarizing liquid, while the compartments *b* contain the excitant and the zinc plates in the present instance. These zinc plates *d* rest upon a terminal plate *e*, forming one terminal of the battery, the casing forming the other terminal. It will be understood, however, that other forms of batteries may be used in carrying out our invention.

In order to make a successful primary battery, it is essential that the depolarizing and excitant liquids should be regenerated and the zinc recovered. A number of experiments have been tried to accomplish this in an economical manner, and we have found that by the use of a single liquid having the two essentials—namely, a depolarizing agent and an excitant—the regeneration can be accomplished and the zinc recovered in an economical manner.

We will describe our invention in connection with the ordinary two-fluid chromic-acid battery. The two fluids ordinarily used are chromic acid (either as such or as liberated from a bichromate) and dilute sulfuric acid, the chromic acid being the depolarizing agent and the dilute sulfuric acid the excitant. The two liquids are separated by means of a porous cup or plate in order to keep the oxidized or red chromic acid from coming in contact with the zinc. After exhaustion each of these two liquids may be generated so as to become just as active again as they were in the first instance were it not for the fact that there is some diffusion of each liquid into the other through the porous cup or plate and each is therefore contaminated by the other. This takes place at each successive discharge and during each regeneration, and consequently the two liquids tend to become alike, each losing some of its active material in doing so. We overcome this serious objection by making both solutions alike in that both contain acid and chromium compounds. The only difference between the two solutions is that the chromium compound in the depolarizing solution is in the oxidized or red chromic acid state, while in the exciting solution it is in the reduced or green chromium state. As the solutions are thus approximately alike in composition, they do not contaminate each other by diffusion as much as in the usual methods. The sulfuric acid of the liquid which is used as a depolarizing agent is for the most part chemically inactive, while the chromium sulfate of the liquid used as the excitant is chemically inactive. Thus there is a certain amount of dead-weight carried by the battery; but this is compensated for in the saving in transportation and regeneration. Thus we are able to use a single solution in the same composition. One we use in one compartment as the depolarizing agent, while in the other compartment it is used as the excitant, the difference being that the depolarizing agent—such, for instance, as chromic acid—has been previously reduced either electrolytically or chemically and either by a former discharge of the same battery or by independent means. The two liquids after the battery has been exhausted are combined and transported to the regenerator as a single liquid, and the regeneration brings the liquid back to its original condition for use in the depolarizing-compartment of a battery, or after the chromic acid is reduced it can be used as the excitant of a primary battery.

In the use of the regeneration process in a two-liquid primary battery the liquids have to be forwarded to a central station separately and returned separately after being regenerated, and by our process we mix the liquids and transport the single mixture, thus materially reducing the expense, and, furthermore, this method enables the whole combined process of discharging and regeneration to become a cycle no matter what the diffusion is.

It will be understood that when the same solution is used first as a depolarizer and then as an exciter the proportions should be such that the chromic acid corresponds to the same number of ampere hours of output as the sulfuric acid. Both ingredients will then be completely exhausted in two equal discharges. After the liquid has been used as an excitant and the sulfuric acid spent the liquid is then transported, as above described, to the regenerating-station and there it is regenerated in any suitable manner.

From a totally-exhausted liquid the zinc is first thrown out at the cathode or negative pole by the passage of a current through the solution, while at the anode the liquid containing reduced chromium, but freed from zinc by previous treatment, is being oxidized. The first-mentioned liquid is then transferred from the cathode-chamber to the anode-chamber, when the reduced-chromium salt is now reoxidized, giving the two solutions necessary—namely, the red-chromium liquid for depolarizing and the free sulfuric acid for the excitant—and, as above described, the red-chromium liquid can be reduced either electrolytically or chemically before the compound is used as an excitant.

We will describe one form of regenerator that may be used in carrying out our invention.

Referring to Fig. 2, E is a container in which are two porous cups $e$ $e$, in the present instance containing scrap lead $e'$. $e^2$ is a lead terminal plate connected to the positive terminal of the dynamo I. F F are carriers on which are trays $f'$ containing mercury, the mercury forming the cathode of the regenerator. The carriers F may be supported by any suitable means, such as the bottom pieces $g$, Fig. 2, and the trays $f'$ may be supported in the carriers F in any convenient manner, such as by means of ledges $g'$, formed on the end walls of the carriers F, as shown in Fig. 3.

The reduced compound as taken from the exhausted battery is placed first in the cathode-chamber and the separated zinc is collected in the mercury-cups. The liquid is then transferred to the anode-chamber and the reoxidation of the green chromium sulfate to chromic acid and sulfuric acid takes place in this anode-compartment, and the regenerated battery solution is then in condition to be used again as the depolarizer of a primary battery.

In this application we have described a process of operating primary batteries, and this process is claimed in the application filed by us on December 6, 1899, Serial No. 739,432, the present application relating to the process of operating a two-liquid primary battery and regenerating the liquid thereof.

We claim as our invention—

1. The process herein described of using and regenerating the liquids of a two-liquid primary battery, the same consisting in charging the cathode-compartment with a mixture of a highly-oxidized metallic compound as a depolarizer, and an acid excitant capable of combining with the exhausted product of the depolarizer, and charging the anode-compartment with a mixture consisting of an acid excitant and a product of reduction of a depolarizing agent, removing the two liquids from the battery after the exhaustion and regenerating the said liquids, substantially as described.

2. The process herein described of using and regenerating the liquids of a two-liquid primary battery, the same consisting in charging the cathode-compartment with a mixture of a highly-oxidized metallic compound as a depolarizer, and an acid excitant capable of combining with the exhausted product of the depolarizer, and charging the anode-compartment with a mixture consisting of an acid excitant and a product of reduction of a depolarizing agent, removing the two liquids from the battery after exhaustion, mixing them and regenerating the mixture by first throwing out the metal which composes the anode of the primary battery, and then bringing all or part of the liquid back to its original condition for use as a depolarizer in a primary battery, substantially as described.

3. The process herein described of using and regenerating two liquid primary batteries, the said process consisting in using as a depolarizing agent a mixture consisting of chromic acid, or a salt thereof, and sulfuric acid and using as an excitant agent a mixture of chromium sulfate and sulfuric acid, transferring the said solutions after the battery has been exhausted to the cathode-compartment of a regenerating-cell, whereby the metal that forms the anode in the battery just discharged is thrown out, and then placing all or part of the liquid in the anode-compartment of the regenerating-cell so that the chromium sulfate may be changed by oxidation to chromic acid and sulfuric acid, substantially as described.

4. The process herein described of regenerating the liquids of a two-liquid primary battery, said process consisting in mixing the exhausted depolarizer and excitant and regenerating said mixture by first throwing out the zinc or other material which formed the anode of the battery, and then bringing all or part of the liquid back to its original condition for use as a depolarizing agent, substantially as described.

In testimony whereof we have signed our names to this specification in the presence of two subscribing witnesses.

HENRY K. HESS.
ALBERT J. SHINN.
CARL HERING.

Witnesses:
WILL. A. BARR,
JOS. H. KLEIN.